(12) United States Patent
Stanek et al.

(10) Patent No.: US 11,816,859 B2
(45) Date of Patent: Nov. 14, 2023

(54) SYSTEMS AND METHODS FOR DETERMINING A VEHICLE LOCATION IN A MANUFACTURING ENVIRONMENT

(71) Applicant: Ford Motor Company, Dearborn, MI (US)

(72) Inventors: Joseph Stanek, Northville, MI (US); Allen R. Murray, Lake Orion, MI (US); Fahad Liaqat, Novi, MI (US); Daniel Robert Taylor, Grosse Ile, MI (US); Sikder Imam, Novi, MI (US); Charles Robert Maxwell Zine, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 317 days.

(21) Appl. No.: 17/364,136

(22) Filed: Jun. 30, 2021

(65) Prior Publication Data

US 2023/0005177 A1   Jan. 5, 2023

(51) Int. Cl.
*G06T 7/73* (2017.01)

(52) U.S. Cl.
CPC ...... *G06T 7/73* (2017.01); *G06T 2207/10016* (2013.01)

(58) Field of Classification Search
CPC ......... G06T 7/0004; G06T 7/20; G06T 7/246; G06T 7/254; G06T 7/70; G06T 7/73; G06T 7/97; G06T 2207/30204; G06T 2207/30252; G06V 20/56; B62D 65/005; G05B 19/4183

See application file for complete search history.

(56) References Cited

U.S. PATENT DOCUMENTS

| | | | |
|---|---|---|---|
| 8,078,349 B1 | 12/2011 | Prada Gomez et al. | |
| 10,242,273 B1 | 3/2019 | Eckman | |
| 2018/0322653 A1* | 11/2018 | Tatarnikov et al. | G06V 30/224 |
| 2020/0249689 A1 | 8/2020 | Tatsubori et al. | |
| 2022/0122283 A1* | 4/2022 | Mayberry et al. | G06T 7/73 |

FOREIGN PATENT DOCUMENTS

CN   110992723 A   4/2020

\* cited by examiner

*Primary Examiner* — Andrew W Johns
(74) *Attorney, Agent, or Firm* — Burris Law, PLLC

(57) ABSTRACT

A method for determining a location of a vehicle including one or more image sensors in a manufacturing environment includes determining, when a key cycle transition condition of the vehicle and a vehicle gear transition condition of the vehicle are satisfied, a location parameter of the vehicle based on an image including a location tag and a previous image obtained from the one or more image sensors. The method includes determining a vehicle time period based on the image and the previous image. The method includes validating a manufacturing routine of the vehicle when the location parameter satisfies a location condition and the vehicle time period satisfies a time condition.

20 Claims, 3 Drawing Sheets

SYSTEMS AND METHODS FOR DETERMINING A VEHICLE LOCATION IN A MANUFACTURING ENVIRONMENT

FIELD

The present disclosure relates to systems and methods for determining a vehicle location in a manufacturing environment.

BACKGROUND

The statements in this section merely provide background information related to the present disclosure and may not constitute prior art.

During a manufacturing process for a vehicle, the vehicle may be temporarily positioned at various locations in a manufacturing environment, such as an end-of-line (EOL) testing location. At the EOL testing location, the vehicle is tested to verify the functionality of, for example, powertrain components, vehicle network components, body components, and chassis components, among other vehicle components. The location of the vehicle may be tracked as it traverses between various bays/stations of the EOL testing location using, for example, location data from global navigation satellite system (GNSS) sensors. However, GNSS sensors may be inaccurate in a manufacturing environment and, more particularly, indoor manufacturing environments. These issues associated with GNSS sensors, among other issues, are addressed by the present disclosure.

SUMMARY

This section provides a general summary of the disclosure and is not a comprehensive disclosure of its full scope or all of its features.

The present disclosure provides a method for determining a location of a vehicle including one or more image sensors in a manufacturing environment. The method includes determining, when a key cycle transition condition of the vehicle and a vehicle gear transition condition of the vehicle are satisfied, a location parameter of the vehicle based on an image including a location tag and a previous image obtained from the one or more image sensors. The method includes determining a vehicle time period based on the image and the previous image. The method includes validating a manufacturing routine of the vehicle when the location parameter satisfies a location condition and the vehicle time period satisfies a time condition.

In one form, the method includes determining the key cycle transition condition of the vehicle is satisfied when the vehicle transitions between an on state and an off state within a threshold key cycle time. In one form, the threshold key cycle time is based on a predetermined elapsed time value after the vehicle transitions between a parked state and a non-parked state. In one form, the method further includes determining the vehicle gear transition condition of the vehicle is satisfied when the vehicle transitions between a parked state and a non-parked state within a threshold gear cycle time. In one form, the location tag is a fiducial marker including position indicia that identifies a predefined position coordinate of the location tag. In one form, the method further includes decoding the fiducial marker to identify the predefined position coordinate of the location tag in the image, where the location parameter is determined based on the predetermined position coordinate of the location tag, and where the location parameter indicates a location of the vehicle, a movement of the vehicle, or a combination thereof. In one form, the movement of the vehicle is determined based on the predefined position coordinate of the location tag in the image and a decoded position coordinate of an additional location tag associated with the previous image. In one form, the vehicle time period is further based on a timestamp of the image and a previous timestamp of the previous image. In one form, the location parameter indicates whether the vehicle has moved from a first location to a second location, and the vehicle time period indicates a difference between (i) a first timestamp associated with the previous image obtained from the one or more image sensors when the vehicle is at the first location and (ii) a second timestamp associated with the image obtained from the one or more image sensors when the vehicle is at the second location. In one form, the location condition is satisfied when the location parameter indicates the vehicle has moved from the first location to the second location, and the time condition is satisfied when the vehicle time period indicates the difference between the first timestamp and the second timestamp is less than a threshold value. In one form, the manufacturing routine is validated when an operational parameter of the vehicle satisfies an operation condition. In one form, the operation condition is satisfied when a diagnostic trouble code of the vehicle, as the operational parameter, is remedied. In one form, the manufacturing routine is an end-of-line testing routine.

The present disclosure provides a system for determining a location of a vehicle in a manufacturing environment, the vehicle including one or more image sensors and a communication circuit. The system includes a processor and a nontransitory computer-readable medium including instructions that are executable by the processor. The instructions include determining a location parameter of the vehicle based on an image including a location tag and a previous image, where the image and the previous image are obtained when a key cycle transition condition of the vehicle and a vehicle gear transition condition of the vehicle are satisfied. The location tag is a fiducial marker including position indicia that identifies a predefined position coordinate of the location tag, the key cycle transition condition of the vehicle is satisfied when the vehicle transitions between an on state and an off state within a threshold key cycle time, and the vehicle gear transition condition of the vehicle is satisfied when the vehicle transitions between a parked state and a non-parked state within a threshold gear cycle time. The instructions include determining a vehicle time period based on the image and the previous image and validating a manufacturing routine of the vehicle when the location parameter satisfies a location condition and the vehicle time period satisfies a time condition.

In one form, the instructions further include decoding the fiducial marker to identify the predefined position coordinate of the location tag, where the location parameter is determined based on the predetermined position coordinate of the location tag, and the location parameter indicates a location of the vehicle, a movement of the vehicle, or a combination thereof. In one form, the vehicle time period is further based on a timestamp of the image and a previous timestamp of the previous image. In one form, the location parameter indicates whether the vehicle has moved from a first location to a second location, and the vehicle time period indicates a difference between (i) a first timestamp associated with the previous image obtained from the one or more image sensors when the vehicle is at the first location and (ii) a second timestamp associated with the image obtained from the one or more image sensors when the vehicle is at the second location. In one form, the location condition is satisfied when the location parameter indicates the vehicle has moved from the first location to the second location, and the time condition is satisfied when the vehicle time period indicates the difference between the first timestamp and the second timestamp is less than a threshold value.

The present disclosure also provides a method for determining a location of a vehicle including one or more image sensors in a manufacturing environment. The method includes determining, when a key cycle transition condition of the vehicle and a vehicle gear transition condition of the vehicle are satisfied, a location parameter of the vehicle based on an image including a location tag and a previous image obtained from the one or more image sensors, where the location tag is a fiducial marker including position indicia that identifies a predefined position coordinate of the location tag, the key cycle transition condition of the vehicle is satisfied when the vehicle transitions between an on state and an off state within a threshold key cycle time, and the vehicle gear transition condition of the vehicle is satisfied when the vehicle transitions between a parked state and a non-parked state within a threshold gear cycle time. The method includes determining a vehicle time period based on the image and the previous image and validating a manufacturing routine of the vehicle when the location parameter satisfies a location condition and the vehicle time period satisfies a time condition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
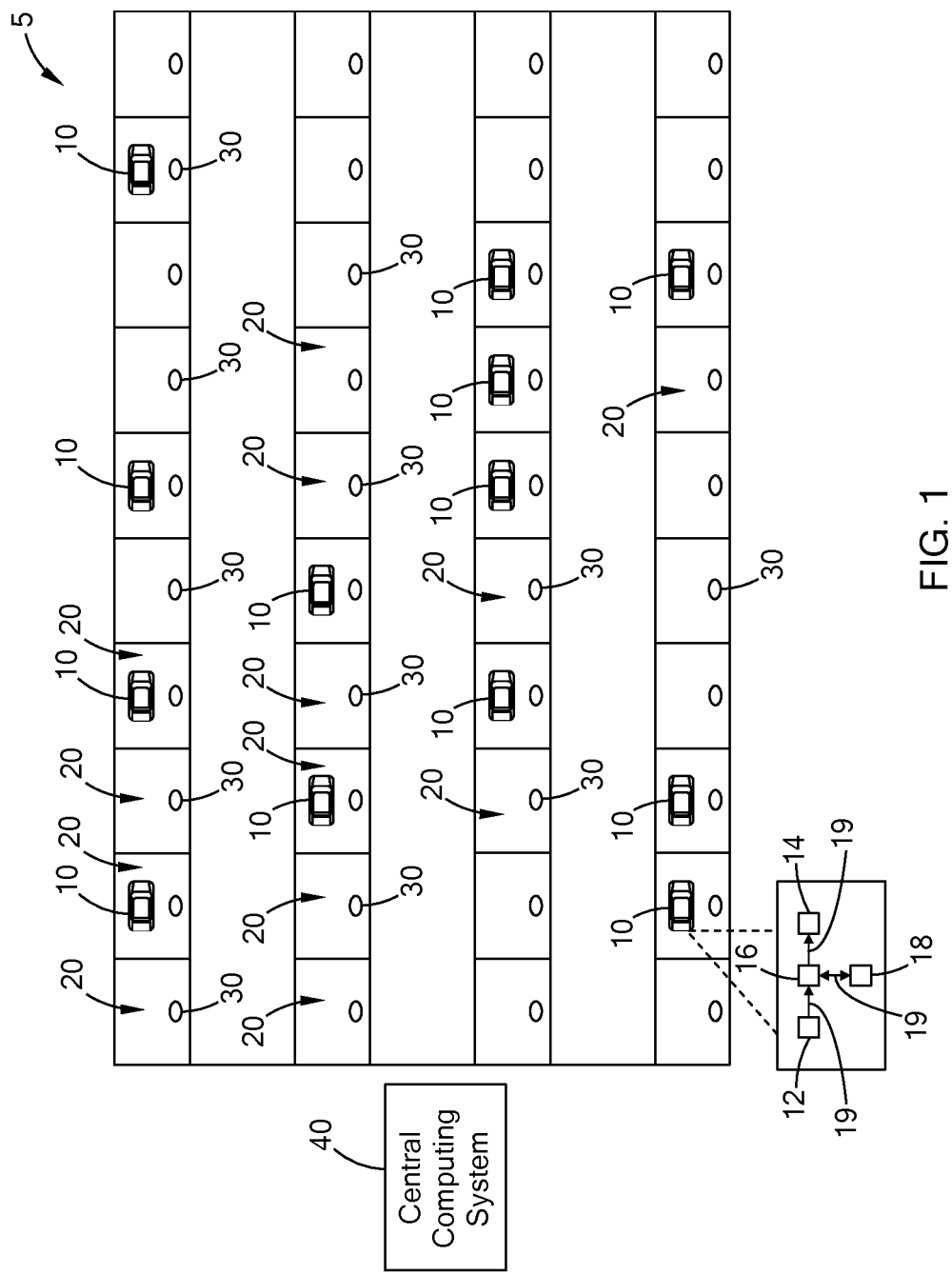
FIG. 1 illustrates a manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a method for determining a location of a vehicle using location tags that identify position coordinates and that are positioned throughout the manufacturing environment. As an example, when various conditions of the vehicle are satisfied (e.g., a key cycle transition condition, a vehicle gear transition condition, among other vehicle conditions), the vehicle obtains an image of the location tag and provides the image to a central computing system. In response to receiving the image, the central computing system compares the image to a previous image obtained by the vehicle to determine a location parameter of the vehicle, such as a location of the vehicle, or determining whether the vehicle has moved from a first location to a second location. Furthermore, the central computing system may determine a vehicle time period based on a timestamp associated with the image and timestamps associated with one or more previous images. The central computing system may selectively validate a manufacturing routine (e.g., an EOL testing routine) based on the location parameter and the vehicle time period. For example, the central computing system may validate that a given EOL testing routine is operating properly in response to the vehicle moving from a first location to a second location and the determined time vehicle time period between images captured at the first and second locations being less than a threshold value. As such, the central computing system can track and monitor the vehicle without GNSS sensors as it traverses, for example, various EOL testing stations to verify that the respective EOL testing routines are sufficiently being performed.

Referring to FIG. 1, a manufacturing environment 5 is provided and generally includes vehicles 10, predefined areas 20, location tags 30, and a central computing system 40. While the central computing system 40 is illustrated as part of the manufacturing environment 5, it should be understood that the central computing system 40 may be positioned remotely from the manufacturing environment 5. In one form, the vehicles 10 and the central computing system 40 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the predefined areas 20 may be any area within the manufacturing environment 5, such as a pre-production location, a production location, a post-production location, among others. As an example, the predefined areas 20 collectively form a parking lot that includes a plurality of parking spaces in which the vehicles 10 are stored, such as a vehicle repair station (e.g., an EOL testing station), a shipping station in which the vehicles 10 are loaded onto a transportation medium (e.g., a car carrier trailer), among other locations. While various examples of the predefined areas 20 of the manufacturing environment 5 are provided, it should be understood that the predefined areas 20 of the manufacturing environment 5 may be any area of the manufacturing environment 5.

In one form, the location tags 30 are fiducial markers that include position indicia (e.g., images, graphics, and/or text) that uniquely identifies a predefined position coordinate of a corresponding predefined area 20. As an example, the location tags 30 are AprilTags (i.e., 2D barcodes having 4-12 bits) and/or quick response (QR) tags that each include a unique 2D barcode, and each 2D barcode is associated with a predefined position coordinate, which may be a global navigation satellite system (GNSS) coordinate, an indoor positioning system-based coordinate/location, and/or other location identifiers. As another example, the location tags 30 may include text of the predefined position coordinates. It should be understood that the location tags 30 may be implemented by various others fiducial markers in other forms and are not limited to the examples described herein. In one form, the location tags 30 may be positioned within or adjacent to the predefined area 20 (e.g., a floor of the corresponding parking space, a fixed infrastructure element within/adjacent to the parking space, among others)

In one form, the vehicle 10 includes image sensors 12, a communication module 14, a control module 16, and vehicle subsystems 18 communicably coupled by a vehicle communication network 19. In one form, the vehicle subsystems 18 include, but are not limited to: an ignition system, a transmission system, vehicle controllers, vehicle sensors, among other vehicle systems. In one form, the vehicle communication network 19 may include, but is not limited to: a controlled area network (CAN), a local interconnect network (LIN), and/or other suitable communication networks.

In one form, the image sensors 12 are configured to selectively obtain images of the manufacturing environment 5 and, more particularly, the location tags 30. The image sensors 12 may be disposed at any location of the vehicle 10, such as a rear, side, and/or front of the vehicle 10. The image sensors 12 may include, but are not limited to: a two-dimensional (2D) camera, a three-dimensional (3D) camera, an infrared sensor, a radar scanner, a laser scanner, among other imaging devices.

In one form, the control module 16 is configured to control various functions of the vehicle 10. As an example, the control module 16 is configured to determine when a key cycle transition condition and a vehicle gear transition condition of the vehicle 10 are satisfied based on data generated by the one or more vehicle subsystems 18. In one form, when the key cycle transition condition and the vehicle gear transition condition of the vehicle 10 are satisfied, the control module 16 is configured to activate the image sensors 12 to obtain images of the location tags 30. As an example, the key cycle transition condition is satisfied when the vehicle 10 transitions between an "ON" state and an "OFF" state within a threshold key cycle time, which is based on a predetermined elapsed time value after the vehicle 10 transitions between a parked state and a non-parked state. As another example, the vehicle gear transition condition is satisfied when the vehicle 10 transitions between the parked state and the non-parked state within a threshold gear cycle time, which is based on a predetermined elapsed time value after the vehicle 10 transitions between the "ON" state and the "OFF" state. Further details regarding the key cycle transition condition and the vehicle gear transition condition are provided below with reference to FIG. 2.

As used herein, the "ON" state refers to when the ignition system of the vehicle 10 is set, either manually or automatically, to one of an accessory mode position, the ignition position, and/or the start position. As used herein, the "OFF" state refers to when the ignition system of the vehicle 10 is not in the "ON" state, such as when the ignition system of the vehicle 10 is set, either manually or automatically, to an off-position/lock position. As used herein, the "parked state" refers to when vehicle 10 is not moving and when the transmission system of the vehicle 10 is set, either manually or automatically, to park. As used herein, the "non-parked state" refers to when the vehicle is not in the parked state (e.g., the vehicle 10 is moving and/or the vehicle 10 is set to drive, reverse, or neutral).

In one form, the communication module 14 is configured to broadcast image data obtained by the image sensors 12 to the central computing system 40 when the key cycle transition condition and the vehicle gear transition condition are satisfied. As an example, the image data may include the image and a timestamp associated with the image. Accordingly, the communication module 14 may include various components for performing the operations described herein, such as, but not limited to, transceivers, routers, and/or input/output interface hardware.

In one form, the central computing system 40 obtains the image data from the communication module 14 and determines a location parameter and a vehicle time period of the vehicle 10 based on the image and a previous image obtained by the respective image sensors 12 of the vehicle 10. Furthermore, the central computing system 40 may validate a manufacturing routine of the vehicle 10 when the location parameter satisfies a location condition and when the vehicle time period satisfies a time condition. Further details regarding the validation of the manufacturing routine are provided below with reference to FIG. 2. In one form, the manufacturing routine may be any routine that is performed at the manufacturing environment 5, including, but not limited to: a production routine, an inspection routine, a vehicle diagnostic routine, an EOL routine, among other routines.

Figure 2:
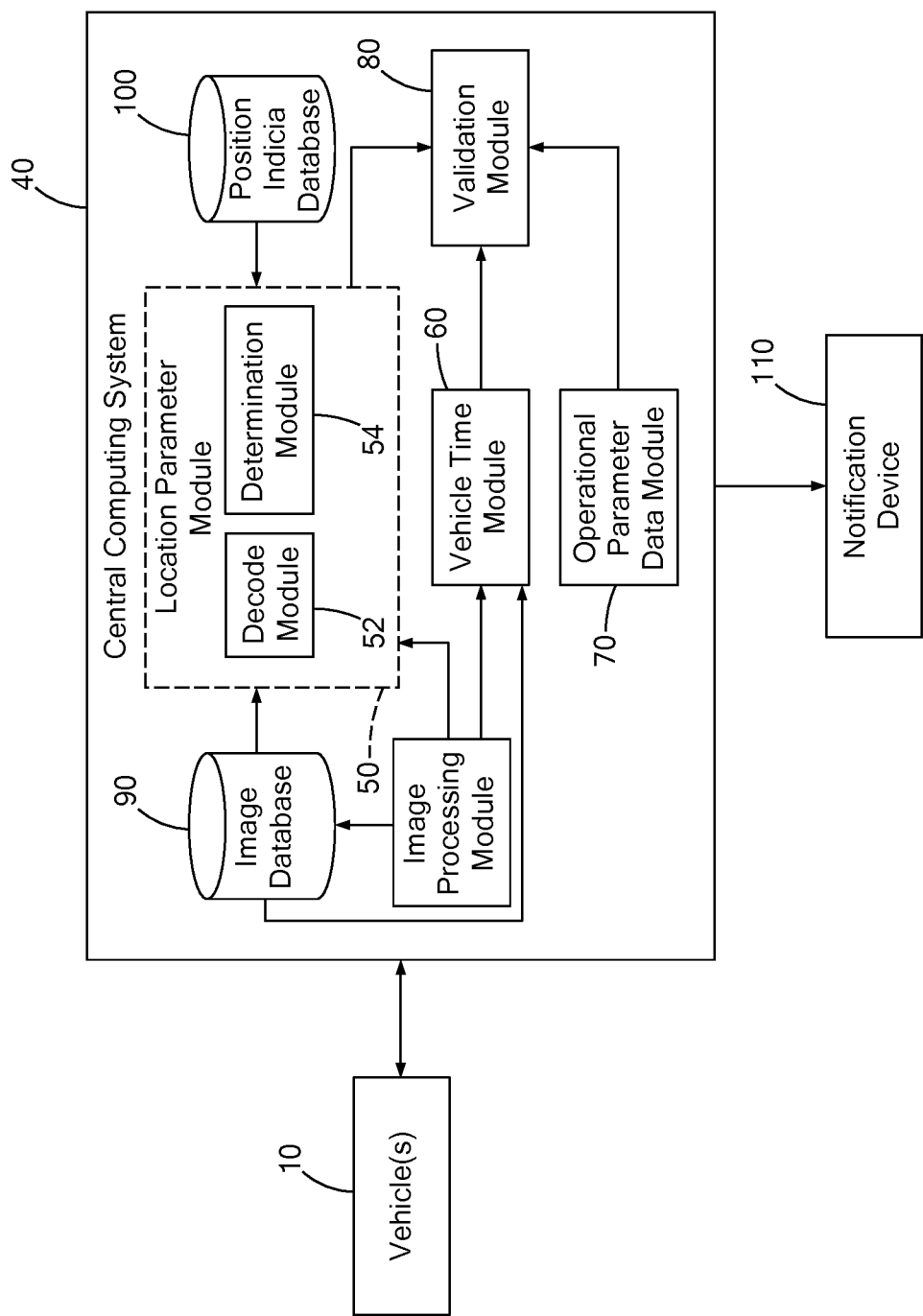
FIG. 2 illustrates a functional block diagram of a vehicle and a central computing system in accordance with the teachings of the present disclosure.

Referring to FIG. 2, the central computing system 40 includes an image processing module 45, a location parameter module 50, a vehicle time module 60, an operational parameter data module 70, a validation module 80, an image database 90, and a position indicia database 100. It should be readily understood that any one of the components of the central computing system 40 can be provided at the same location or distributed at different locations (e.g., via one or more edge computing devices) and communicably coupled accordingly.

In one form, the image processing module 45 receives the image data broadcasted by the communication module 14 when the key cycle transition condition and the vehicle gear transition condition are satisfied. As an example, when the vehicle 10 transitions from the "ON" state to the "OFF" state within the threshold key cycle time and the vehicle 10 is set to park, the communication module 14 transmits the image data to the image processing module 45. In response to receiving the image data from the communication module 14, the image processing module 45 provides the image to the location parameter module 50 and the timestamps associated with the images to the vehicle time module 60.

In one form, the image processing module 45 stores the image data in the image database 90, which includes a plurality of entries that correlate an image to the timestamp associated with the image. In some forms, the image processing module 45 may additionally store vehicle identification information associated with the vehicle 10, location parameters determined by the location parameter module 50, vehicle time periods determined by the vehicle time module 60, and other data associated with the vehicle 10. As such, the central computing system 40 may monitor and track the image data, location parameters, and vehicle time periods of the vehicle 10.

In one form, the location parameter module 50 includes a decode module 52 and a determination module 54. In one form, the decode module 52 is configured to identify the position indicia of the location tags 30 based on the image and indicia-position coordinate entries from the position indicia database 100, where each entry associates each of the location tags 30 with a predefined position coordinate. As an example, the decode module 52 employs known digital image recognition techniques to decode the 2D barcode, text, and/or images of the location tag 30 and therefore determine the position indicia of the location tag 30. The decode module 52 then determines the predefined position coordinate of the location tag 30 based on the corresponding indicia-position coordinate entry from the position indicia database 100.

In one form, the determination module 54 is configured to determine a location parameter of the vehicle 10 based on the predefined position coordinate of the location tag 30 detected in the image and a previous image obtained by the image sensors 12 and stored in the image database 90. In one form, the location parameter includes the location of the vehicle 10 within the manufacturing environment 5 as indicated by the predefined position coordinate. In one form, the location parameter indicates whether the vehicle 10 has moved from a first location to a second location based on the predefined position coordinate and a decoded position coordinate of an additional location tag 30 associated with the previous image.

In one form, the vehicle time module 60 determines a vehicle time period based on a timestamp of the image received from the image processing module 45 and a previous timestamp of the previous image obtained by the image sensors 12 and stored in the image database 90. As an example, the vehicle time module 60 determines the vehicle time period based on a difference between the previous timestamp associated with the previous image when the vehicle 10 is at the first location and the timestamp associated with the image when the vehicle 10 is at a second location.

In one form, the validation module 80 is configured to determine whether the location parameter satisfies a location condition. As an example, the validation module 80 determines the location condition is satisfied when the location parameter indicates that the vehicle 10 has moved from a first location to a second location. As another example, the validation module 80 determines the location condition is satisfied when the vehicle 10 has moved to a predefined location. It should be understood that the location condition may be satisfied based on other criteria associated with the location parameter and is not limited to the examples described herein.

In one form, the validation module 80 is configured to determine whether the vehicle time period satisfies a time condition. As an example, the validation module 80 determines the time condition is satisfied when the vehicle time period indicates that the difference between the timestamp (i.e., most recent timestamp) and a previous timestamp is less than a threshold value. It should be understood that the time condition may be satisfied based on other criteria associated with the vehicle time period and is not limited to the example described herein.

In one form, the validation module 80 is configured to validate a manufacturing routine (e.g., an EOL testing routine) when the location parameter satisfies the location condition and the vehicle time period satisfies the time condition. As used herein, "validating the manufacturing routine" refers to determining that the manufacturing routine is being performed in accordance with acceptable and predefined tolerances, states, conditions, and/or values. As an example, validating the manufacturing routine may include determining that a production routine and/or inspection routine of the vehicle 10 is proper as a result of the vehicle 10 traversing the manufacturing environment 5 in accordance with predefined cycle times associated with the predefined areas 20. As another example, validating the manufacturing routine may include determining that a vehicle diagnostic routine and/or EOL routine of the vehicle 10 is properly completed as a result of the vehicle 10 traversing the manufacturing environment 5 in accordance with a given time period associated with performing the vehicle diagnostic/EOL routines at the predefined areas 20.

In one form, the validation module 80 is configured to validate the manufacturing routine when the operational parameter data module 70 determines that an operational parameter of the vehicle 10 satisfies an operation condition. In one form, the operation condition may include whether sensor data, diagnostic/EOL testing data, state data, and/or other data of the vehicle 10 corresponds to a predetermined value and/or state. As such, the operational parameter data module 70 may obtain various operational information from the vehicle subsystems 18 via the communication module 14 to determine whether the operational parameter satisfies the operation condition. As an example, the operational parameter data module 70 determines the operation condition is satisfied when the operational data indicates a diagnostic trouble code (DTC) of the vehicle 10 is remedied during an EOL testing routine that is performed at one of the predefined areas 20. Accordingly, the validation module 80 may validate the manufacturing routine when the location parameter satisfies the location condition, the vehicle time period satisfies the time condition, and the operational parameter satisfies an operation condition.

In one form, the central computing system 40 is configured to broadcast a command to a notification device 110 to output an alarm, an alert, and/or a notification based on the determination of the validation module 80. As an example, the central computing system 40 may instruct the notification device 110 (e.g., a visual display device, an audio device, a human machine interface (HMI), and/or a tactile feedback device provided within the manufacturing environment 5, the vehicle 10, or the central computing system 40) to output an alarm in response to the validation module 80 not validating the manufacturing routine, thereby enabling an operator to perform various corrective actions on the vehicle 10 and/or the manufacturing routine parameters.

Figure 3:
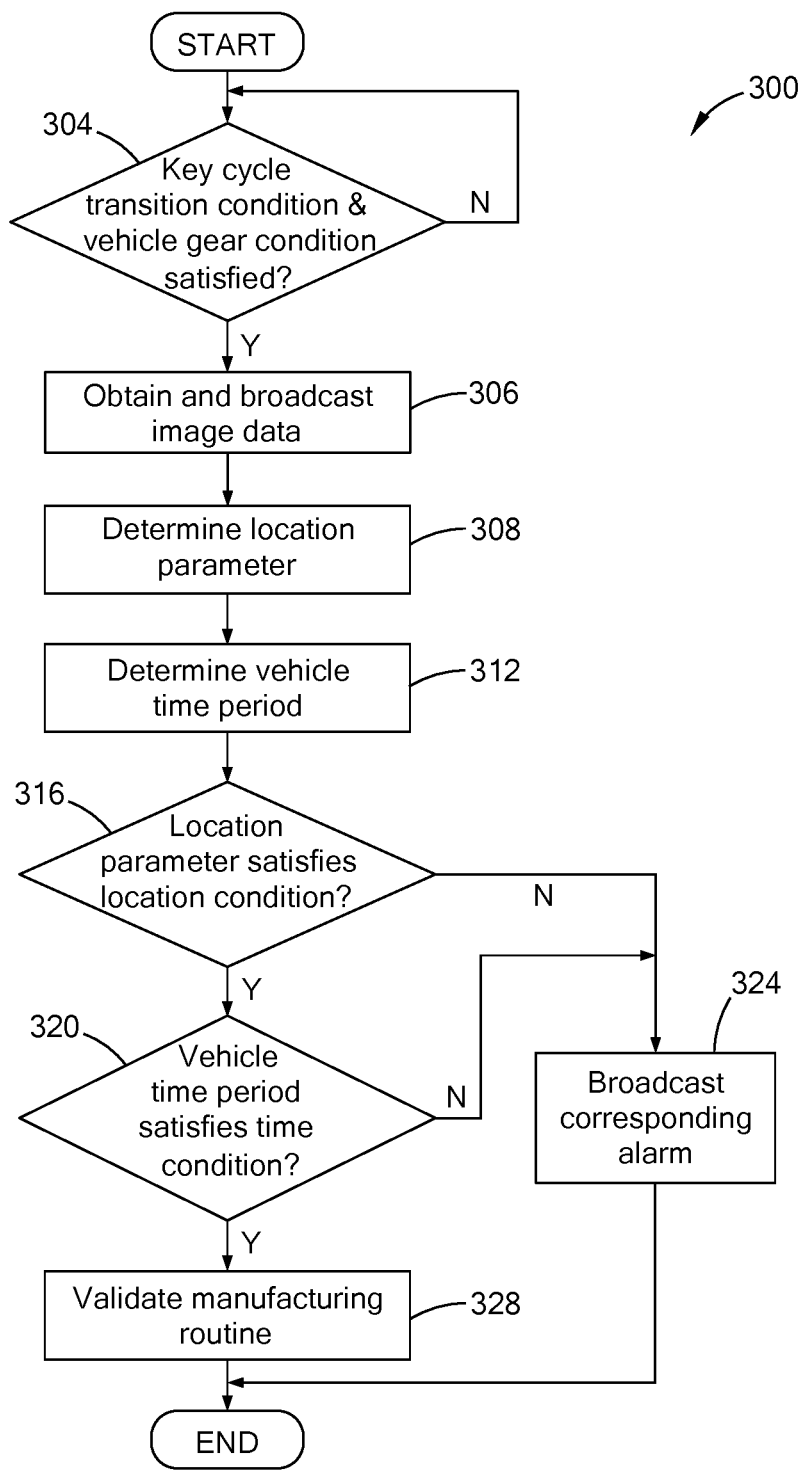
FIG. 3 is a flowchart of an example control routine in accordance with the teachings of the present disclosure.

With reference to FIG. 3, a routine 300 for determining a location of the vehicle 10 within the manufacturing environment 5 is provided. At 304, the vehicle 10, and more particularly, the control module 16, determines whether the key cycle transition condition and the vehicle gear transition condition are satisfied. If so, the routine 300 proceeds to 306. Otherwise, if the key cycle transition condition and the vehicle gear transition condition are not satisfied, the routine 300 remains at 304 until both the key cycle transition condition and the vehicle gear transition condition are satisfied. At 306, the vehicle 10 obtains and broadcasts the image data to the central computing system 40. At 308, the central computing system 40 determines the location parameter based on the image data, and the central computing system 40 determines the vehicle time period based on the image data at 312.

At 316, the central computing system 40 determines whether the location parameter satisfies the location condition. If so, the routine 300 proceeds to 320. If the location parameter does not satisfy the location condition at 316, the routine 300 proceeds to 324. At 320, the central computing system 40 determines whether the vehicle time period satisfies the time condition. If so, the routine 300 proceeds to 328. If the vehicle time period does not satisfy the time condition at 320, the routine 300 proceeds to 324. At 324, the central computing system 40 broadcasts an alarm to the notification device 110 based the location parameter not satisfying location condition and/or the vehicle time period not satisfying the time condition. At 328, the central computing system 40 validates a manufacturing routine associated with the vehicle 10 (e.g., a production routine, a vehicle diagnostics routine, among others).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for determining a location of a vehicle including one or more image sensors in a manufacturing environment, the method comprising:
   determining, when a key cycle transition condition of the vehicle and a vehicle gear transition condition of the vehicle are satisfied, a location parameter of the vehicle based on an image including a location tag and a previous image obtained from the one or more image sensors;
   determining a vehicle time period based on the image and the previous image; and
   validating a manufacturing routine of the vehicle when the location parameter satisfies a location condition and the vehicle time period satisfies a time condition.

2. The method of claim 1 further comprising determining the key cycle transition condition of the vehicle is satisfied when the vehicle transitions between an on state and an off state within a threshold key cycle time.

3. The method of claim 2, wherein the threshold key cycle time is based on a predetermined elapsed time value after the vehicle transitions between a parked state and a non-parked state.

4. The method of claim 1 further comprising determining the vehicle gear transition condition of the vehicle is satisfied when the vehicle transitions between a parked state and a non-parked state within a threshold gear cycle time.

5. The method of claim 4, wherein the threshold gear cycle time is based on a predetermined elapsed time value after the vehicle transitions between an on state and an off state.

6. The method of claim 1, wherein the location tag is a fiducial marker including position indicia that identifies a predefined position coordinate of the location tag.

7. The method of claim 6 further comprising decoding the fiducial marker to identify the predefined position coordinate of the location tag in the image, wherein the location parameter is determined based on the predetermined position coordinate of the location tag, and wherein the location parameter indicates a location of the vehicle, a movement of the vehicle, or a combination thereof.

8. The method of claim 7, wherein the movement of the vehicle is determined based on the predefined position coordinate of the location tag in the image and a decoded position coordinate of an additional location tag associated with the previous image.

9. The method of claim 1, wherein the vehicle time period is further based on a timestamp of the image and a previous timestamp of the previous image.

10. The method of claim 1, wherein:
    the location parameter indicates whether the vehicle has moved from a first location to a second location; and
    the vehicle time period indicates a difference between (i) a first timestamp associated with the previous image obtained from the one or more image sensors when the vehicle is at the first location and (ii) a second timestamp associated with the image obtained from the one or more image sensors when the vehicle is at the second location.

11. The method of claim 10, wherein:
    the location condition is satisfied when the location parameter indicates the vehicle has moved from the first location to the second location; and
    the time condition is satisfied when the vehicle time period indicates the difference between the first timestamp and the second timestamp is less than a threshold value.

12. The method of claim 1, wherein the manufacturing routine is validated when an operational parameter of the vehicle satisfies an operation condition.

13. The method of claim 12, wherein the operation condition is satisfied when a diagnostic trouble code of the vehicle, as the operational parameter, is remedied.

14. The method of claim 1, wherein the manufacturing routine is an end-of-line testing routine.

15. A system for determining a location of a vehicle in a manufacturing environment, the vehicle including one or more image sensors and a communication circuit, the system comprising:

a processor; and a nontransitory computer-readable medium including instructions that are executable by the processor, wherein the instructions include:

determining a location parameter of the vehicle based on an image including a location tag and a previous image, wherein the image and the previous image are obtained when a key cycle transition condition of the vehicle and a vehicle gear transition condition of the vehicle are satisfied, and wherein:

the location tag is a fiducial marker including position indicia that identifies a predefined position coordinate of the location tag;

the key cycle transition condition of the vehicle is satisfied when the vehicle transitions between an on state and an off state within a threshold key cycle time; and the vehicle gear transition condition of the vehicle is satisfied when the vehicle transitions between a parked state and a non-parked state within a threshold gear cycle time;

determining a vehicle time period based on the image and the previous image; and validating a manufacturing routine of the vehicle when the location parameter satisfies a location condition and the vehicle time period satisfies a time condition.

16. The system of claim 15, wherein the instructions further comprise decoding the fiducial marker to identify the predefined position coordinate of the location tag, wherein the location parameter is determined based on the predetermined position coordinate of the location tag, and wherein the location parameter indicates a location of the vehicle, a movement of the vehicle, or a combination thereof.

17. The system of claim 15, wherein the vehicle time period is further based on a timestamp of the image and a previous timestamp of the previous image.

18. The system of claim 15 wherein:

the location parameter indicates whether the vehicle has moved from a first location to a second location; and the vehicle time period indicates a difference between (i) a first timestamp associated with the previous image obtained from the one or more image sensors when the vehicle is at the first location and (ii) a second timestamp associated with the image obtained from the one or more image sensors when the vehicle is at the second location.

19. The system of claim 18, wherein:

the location condition is satisfied when the location parameter indicates the vehicle has moved from the first location to the second location; and the time condition is satisfied when the vehicle time period indicates the difference between the first timestamp and the second timestamp is less than a threshold value.

20. A method for determining a location of a vehicle including one or more image sensors in a manufacturing environment, the method comprising:

determining, when a key cycle transition condition of the vehicle and a vehicle gear transition condition of the vehicle are satisfied, a location parameter of the vehicle based on an image including a location tag and a previous image obtained from the one or more image sensors, wherein:

the location tag is a fiducial marker including position indicia that identifies a predefined position coordinate of the location tag;

the key cycle transition condition of the vehicle is satisfied when the vehicle transitions between an on state and an off state within a threshold key cycle time; and the vehicle gear transition condition of the vehicle is satisfied when the vehicle transitions between a parked state and a non-parked state within a threshold gear cycle time;

determining a vehicle time period based on the image and the previous image; and validating a manufacturing routine of the vehicle when the location parameter satisfies a location condition and the vehicle time period satisfies a time condition.

* * * * *